United States Patent Office 3,069,423
Patented Dec. 18, 1962

3,069,423
THERAPEUTIC SALTS
Charles H. Grogan, Falls Church, and Charles F. Geschickter, Lorton, Va., assignors to the Geschickter Fund for Medical Research, Washington, D.C., a corporation of New York
No Drawing. Filed June 26, 1959, Ser. No. 823,015
3 Claims. (Cl. 260—286)

This invention relates to compositions of matter in the form of organic compounds of chemotherapeutic value and more particularly to compositions of value in the treatment of arthritic disease.

Specifically, the present invention involves the discovery and novel medicinal use of certain salts of thiodisalicylic acid.

It is accordingly a primary object of the present invention to provide novel organic salts as well as their methods of preparation.

Another object of the present invention is to provide novel physiologically active salts characterized by chemotherapeutic and medicinal properties useful in the treatment of diseases.

Another object of the present invention is to provide novel physiologically active salts characterized by chemotherapeutic and medicinal properties useful in the treatment of arthritic diseases.

Still another object of the present invention is to provide novel compositions of matter, viz., the thiodisalicylic acid salts of 4-[4-diethylamino-1-methyl]butylamino)-7-chloro-quinoline and 6-methoxy-8([5-isopropylamino] pentylamino) quinoline.

These and further objects and advantages of the invention and the manner in which they are accomplished will be more apparent from the following description of the class of compounds and the specific examples and methods of obtaining them.

The novel therapeutically and medicinally useful salts of the present invention may be represented by the following formula:

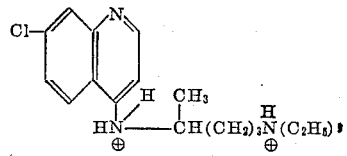

I

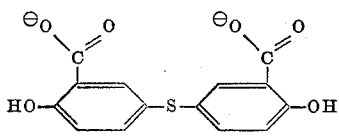

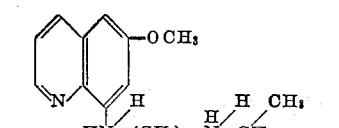

II

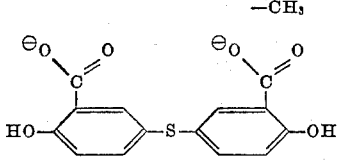

wherein Formula I represents 4-[4-diethylamino-1-methyl]butylamino)-7-chloro-quinoline thiodisalicylate and Formula II represents 6-methoxy-8-([5-isopropylamino] pentylamino) quinoline thiodisalicylate. The quinoline bases of the above two compounds will hereinafter be referred to as chloroquin and pentaquin, respectively.

The compounds represented by Formulas I and II are very stable, are non-hygroscopic and are free-flowing powders or micro-crystals that can be readily compounded for oral administration, or made into sterile solutions for parenteral administration.

The preparation of the novel salts of the present invention is illustrated by the following examples.

EXAMPLE I

*Chloroquin Thiodisalicylate*

Method A: 23.75 grams of finely powdered thiodisalicylic acid was suspended in 250 ml. of boiling reagent acetone. A solution of 25 grams of chloroquin in 100 ml. of boiling acetone was added slowly with vigorous stirring. As the reaction proceeded all of the thiodisalicylic acid disappeared from suspension and a thick viscous pale greenish oil collected at the bottom of the flask. The reaction mixture was heated with vigorous agitation for 10 minutes after all the chloroquin base had been added. It was allowed to cool to room temperature, the acetone decanted and 200 ml. of fresh acetone added. The residue was warmed to the boiling point with vigorous stirring, cooled and the wash acetone decanted. The residue was dried in vacuo whereupon it crystallized. The yield was 95% or better by this method and the crude material melted between 165–170° C.

Method B: Since chloroquin is quite soluble in most common organic solvents while thiodisalicylic acid is not, a trial of various solvent systems was made, in order to find a simpler preparation yielding a purer product initially. The following systems also gave the desired product.

| No. | 0.95 g. of "chloroquin" in 10 ml. | 1 g. thiodisalicylic acid dissolved or suspended in— | Added to cooled rean. mixture to cloudiness |
|---|---|---|---|
| 1 | Acetone | Methanol | Water. |
| 2 | Methyl ethyl ketone. | Methyl ethyl ketone. | 30–60° C. petroleum ether. |
| 3 | Acetone | Ethyl acetate | Benzene. |
| 4 | Methylene chloride. | Methanol | 30–60° C. petroleum ether. |

All systems deposited pale greenish or brownish oils. Only #3 crystallized spontaneously on standing. All others crystallized readily on seeding from #3. The melting points of the crude products were respectively: #1, 185–188° C.; #2, 160–165° C.; #3, 187–188° C.; and #4, 187–189° C. The reaction in #4 was rapid, clean, yielded a very pure product, and the solvents were readily volatile.

To 23.75 grams of thiodisalicylic acid dissolved and suspended in 200 ml. of boiling methanol was added 25 grams of chloroquin dissolved in 100 ml. of methylene chloride. The reaction mixture was stirred rapidly on addition and a vigorous reaction ensued. On cooling to room temperature, 30–60° C. petroleum ether was added to cloudiness. Refrigeration produced a pale greenish oil which did not solidify. Sufficient petroleum ether was added to throw out all the salt as an oil and the solvents decanted. If the mixture is seeded after addition of petroleum ether the salt is obtained as a white crystalline solid with a pale greenish tint. On filtering and drying it is white. On recrystallization from methanol-benzene, methanol-30–60° petroleum ether, the salt melted at 189–191° C. with decomposition.

*Analysis.*—Calculated for $C_{32}H_{36}ClN_3O_6S$:

| Calc'd, percent | Element | Found, percent |
|---|---|---|
| 61.38 | Carbon | 61.29 |
| 5.79 | Hydrogen | 5.62 |
| 6.71 | Nitrogen | 6.47 |

EXAMPLE II

Pentaquin Thiodisalicylate

In this example, 21 grams of pentaquin dissolved in 50 ml. of acetone was added with vigorous stirring to a boiling suspension of 22.33 grams of finely powdered thiodisalicylic acid in 200 ml. of acetone. As the rapid reaction proceeded all thiodisalicylic acid went into solution, yielding a deep reddish-orange solution. Within a few minutes bright orange red crystals started forming and the salt rapidly crystallized leaving a nearly colorless supernatant. The salt was filtered off, washed with acetone, and dried at 100° C. The crude salt melted at 192–193° C. with a yield of 95% or better. On recrystallization from methanol and water it melted at 195–196° C.

*Analysis.*—Calculated for $C_{32}H_{37}N_3O_7S$:

| Cal'd, percent | Element | Found, percent |
| --- | --- | --- |
| 63.26 | Carbon | 63.40 |
| 6.13 | Hydrogen | 6.18 |
| 6.91 | Nitrogen | 6.88 |

For the treatment of arthritic disease, the salts are administered orally in the form of tablets or capsules. The average dose, depending on the severity and type of arthritic disease varies from 10–30 mg. of the pentaquin salt and from 200–300 mg. of the chloroquin salt. The salts may be administered parenterally in aqueous solution containing propylene glycol or glycerol formal.

The specific compounds and methods disclosed herein are to be considered in all respects as illustrative and not restrictive, the scope of the invention being indicated by the appended claims rather than the foregoing description, and all specific compounds and methods which come within the meaning and the range of equivalency of the claims are intended to be embraced therein.

What is claimed and desired to be secured by United States Letters Patent is:

1. A compound selected from the group consisting of 4 - ([4-diethylamino - 1 - methyl]butylamino) - 7 - chloroquinoline thiodisalicylate and 6-methoxy-8-([5-isopropylamino]pentylamino)quinoline thiodisalicylate.
2. The compound 4-([4-diethylamino-1-methyl]butylamino)-7-chloro-quinoline thiodisalicylate.
3. The compound 6-methoxy-8-([5-isopropylamino]-pentylamino)quinoline thiodisalicylate.

References Cited in the file of this patent

UNITED STATES PATENTS

| | | |
| --- | --- | --- |
| 2,233,970 | Andersag et al. | Mar. 4, 1941 |
| 2,492,467 | Drake et al. | Dec. 27, 1949 |
| 2,508,937 | Campbell | May 23, 1950 |
| 2,594,418 | Geschickter et al. | Apr. 27, 1952 |
| 2,838,441 | Allen et al. | June 10, 1958 |
| 2,844,510 | Lorenz et al. | July 22, 1958 |

OTHER REFERENCES

Chevalier: Bulletin Academic Medicine, vol. 113, pages 799–801 (1935).

Wiselogle: Survey of Antimalarial Drugs, vol. 2, part 2, pages 1145 and 1189 (1946).

Freedman: Ann. Rheumatic Diseases, vol. 15, pages 251–7 (1956).

Drug Trade New (Manufacturing Section), pp. 51 and 60, September 9, 1957.

Journal of Pharmacy and Pharmacology, vol. 10, pp. 194–196 (1958).